June 5, 1951 — R. B. EVANS ET AL — 2,556,076
TROOPSHIP TYPE AIRPLANE SEAT STRUCTURES
Filed Sept. 15, 1944 — 4 Sheets-Sheet 1

INVENTORS.
Robert B. Evans,
Sulo M. Nampa.
BY
Harness, Dickey & Pierce.
ATTORNEYS.

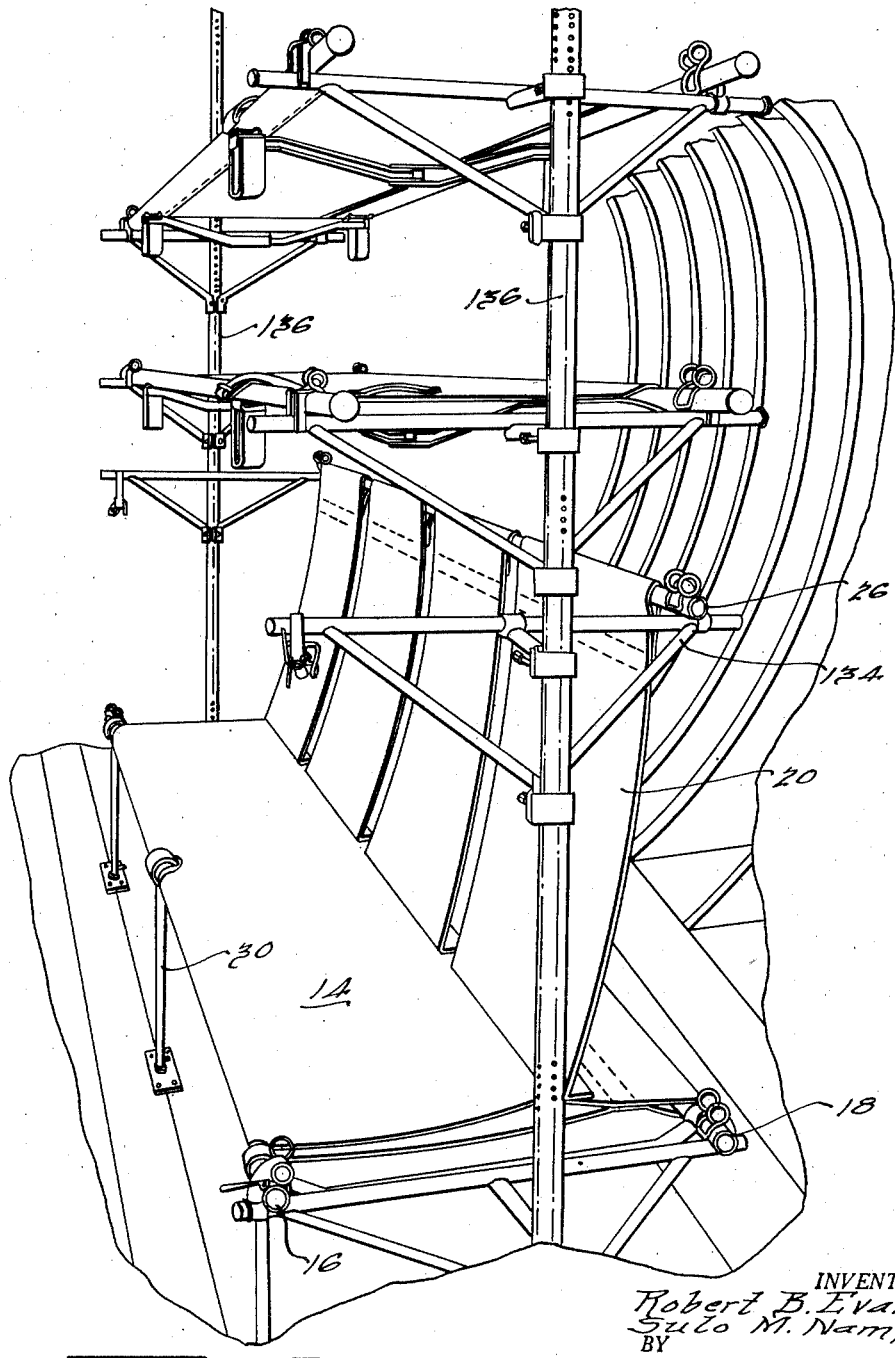

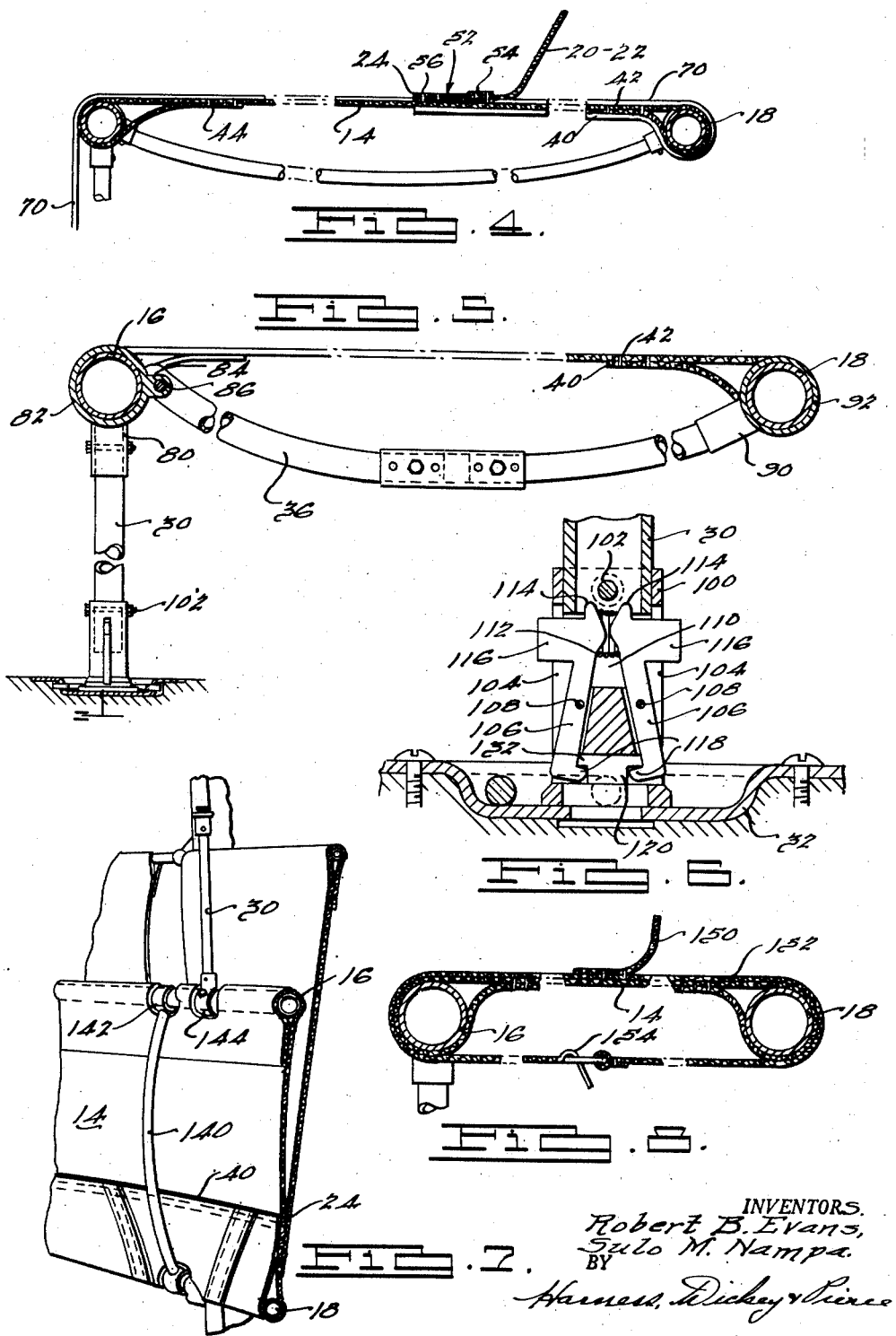

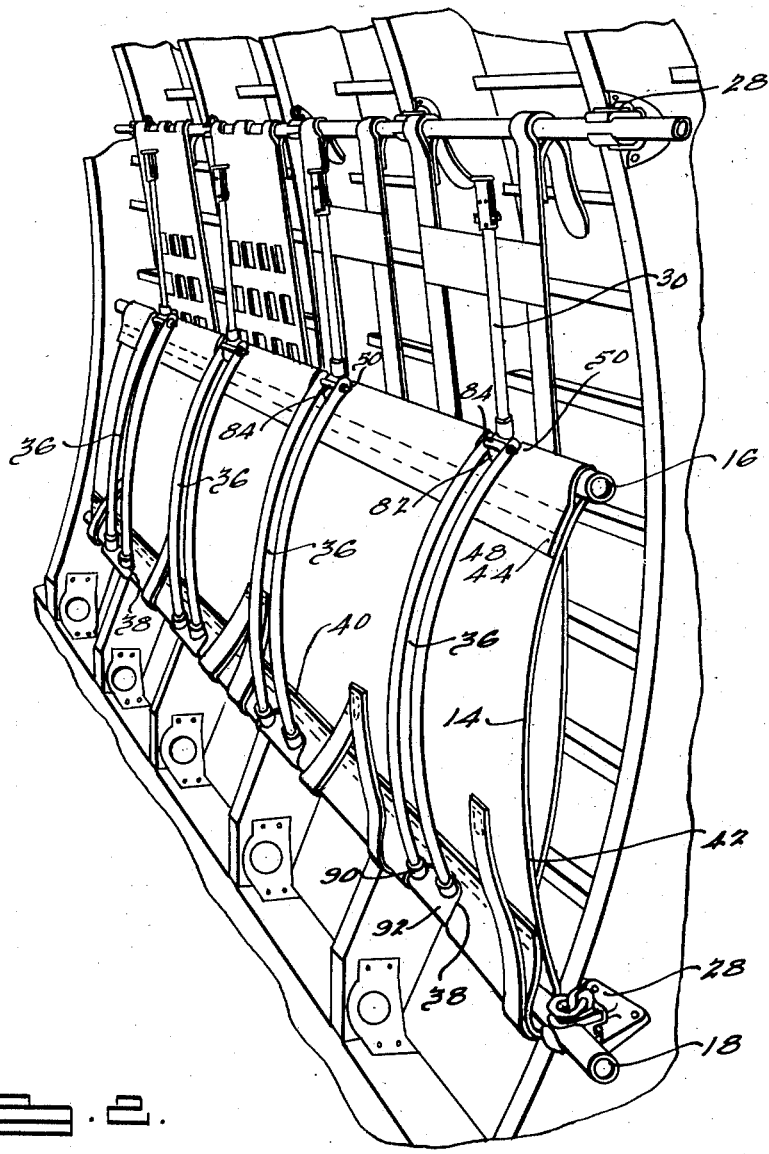

Patented June 5, 1951

2,556,076

UNITED STATES PATENT OFFICE 2,556,076

TROOPSHIP TYPE AIRPLANE SEAT STRUCTURE

Robert B. Evans, Grosse Pointe Shores, and Sulo Michael Nampa, Detroit, Mich.

Application September 15, 1944, Serial No. 554,203

17 Claims. (Cl. 5—9)

The present invention relates to seat structures, and is particularly directed to the provision of improved seat structures having flexible back and seat portions and being readily foldable and removable and which also can be convertibly used as beds, bunks, or litters and as multiple seats.

Principal objects of the invention are to provide constructions of the above type, which are extremely simple in construction, economical of manufacture and assembly, and light in weight, which are readily convertible as aforesaid and which may be readily installed in and removed from associated structures, such for example as transport aircraft; to provide such constructions which, when utilized as a bed, afford a surface of desirable width and which, when utilized as a seat, provide a seat of desirably less depth; to provide such constructions which define a longitudinally extending bed surface, having spaced side rails and which further define a plurality of seat backs which extend upwardly from the bed surface in the region adjacent one of the rails; to provide such constructions in which the seat backs are secured to the seat surface at points between the aforesaid rails, whereby to afford the aforesaid difference between the effective width of the structure as a bed and the effective depth of each of the seats afforded by the structure; to provide such constructions wherein the seat backs can conveniently be released from associated upper supports and be folded down, in converting the structure to a bed; to provide such constructions wherein each seat back is of sufficient height to support the head as well as the back of the occupant; to provide such constructions in which the upper ends of the backs are supported by a rail common thereto, said back rail and one of the aforesaid seat rails being removably secured to the supporting structure, and the remaining seat rail being provided with legs which are detachably engageable with the floor of the associated structure; to provide such constructions in which the seat can be folded up against the backs and in which the legs are adjustable relative to the associated front rail so that they do not protrude when the seat is folded; to provide such structures in which the spacing between the aforesaid side rails is maintained by spreaders of improved construction; to provide such constructions employing safety belts of the general type used in aircraft practice, but having an improved connection to the seat structure; and to generally improve and simplify the construction and arrangement of structures of the above type.

With the above as well as other and in certain cases more detailed objects in view, preferred but illustrative embodiments of the invention are shown in the accompanying drawings, throughout the several views of which corresponding reference characters are used to designate corresponding parts, and in which:

Figure 2 is a perspective view, showing the structure of Figure 1 in the folded position;

Figure 3 is a perspective view showing an alternative supporting structure for the structure of Figures 1 and 2;

Figure 4 is a fragmentary view in horizontal transverse section, of the seat structure of Figure 1;

Figure 5 is a fragmentary view illustrating details of the leg structures;

Figure 6 is an enlarged sectional view showing a releasable connection between a leg structure and a floor fitting;

Fig. 7 is a fragmentary view in perspective of a modified embodiment of the invention; and Figure 8 is a fragmentary view of a further modification of the invention.

Figures 1, 1A:
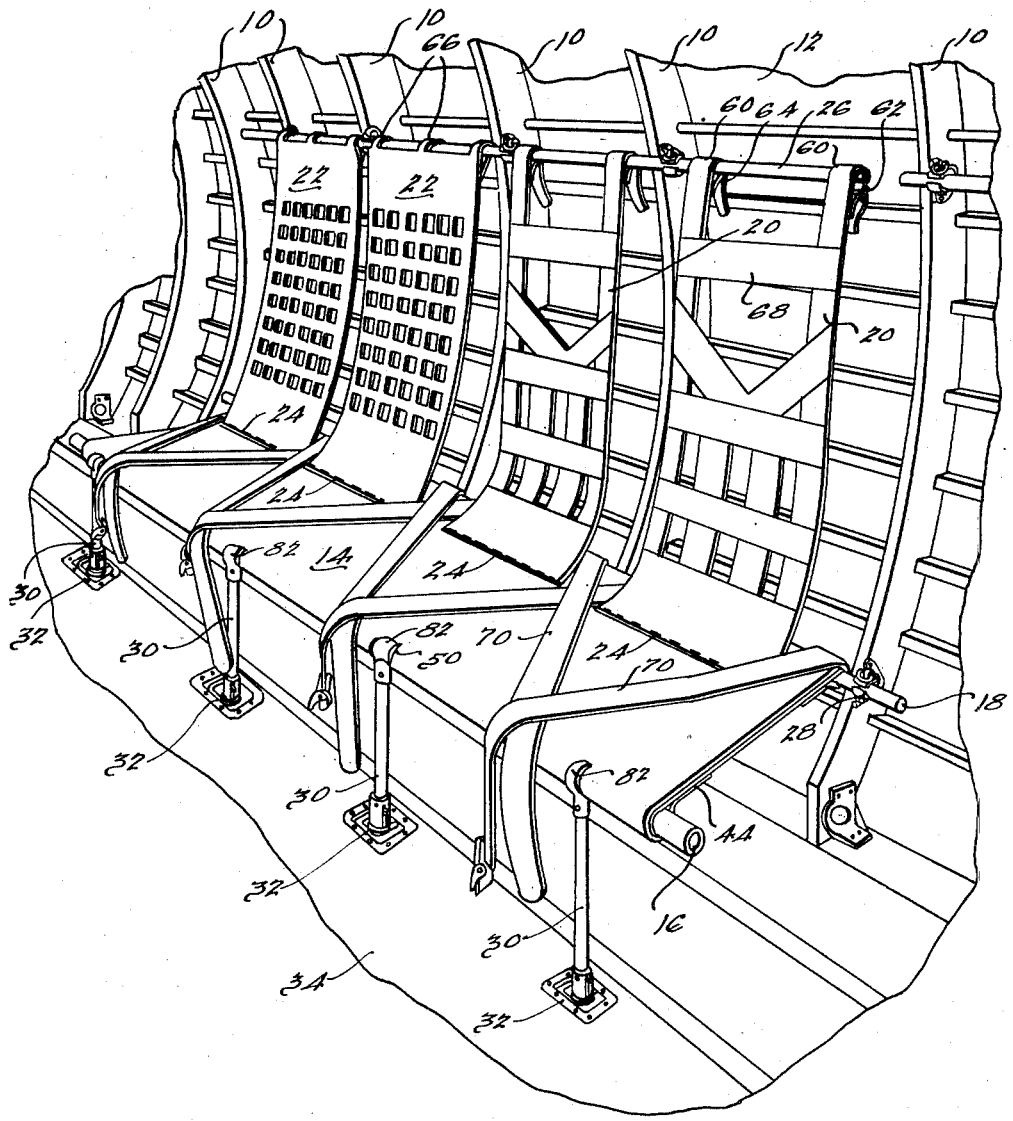
Figure 1 is a view in perspective of an embodiment of the invention.
Figure 1A is a fragmentary view of a variant of Figure 1.

It will be appreciated from a complete understanding of the present invention that, in the broader aspects, the improvements thereof may be utilized in widely differing seat and/or bed constructions and/or convertible constructions, intended for widely differing types of service and/or association with widely differing structures. Further, in a generic sense, certain of the present improvements can be utilized independently of the others of such improvements.

A preferred but illustrative application of the invention, is in providing convertible seat and bed structures for use in aircraft of the transport type; and more particularly in those instances where it is desired that the seat and bed structures shall be readily removable from and installable in the airplane structure, as well as being foldable or otherwise collapsible so that, when not in use, the structures do not interfere with the otherwise usable cargo space. The present application discloses such an application of the invention, in an illustrative but not in a limiting sense.

Referring first to Figures 1 and 2, the improved seat and bed structure is illustrated as being arranged along one side of an associated airplane, the usual structural and fuselage surface elements of which are designated respectively as 10 and 12. The improved structure comprises generally a seat or bed surface 14, which is suspended between laterally spaced parallel side rails 16 and 18, and which is of sufficient width and length to readily and comfortably accommodate an occupant in lying position lengthwise thereof. In addition, the structure defines a plurality of individual backs 20 and 22, the lower end of each back being secured to the seat surface 14 as indicated at 24 and the upper end of each back being detachably secured to a back rail 26. As shown, rails 18 and 26 are removably secured to the ribs 10 by adjustable clamps 28. Clamps 28 are rigidly secured to the ribs 10 and may and preferably do take the particular form described and claimed in the copending application Serial No. 554,204, filed September 15, 1944, by the present applicants and Milton R. Federle, which application later became abandoned, and was replaced by a continuation application, Serial No. 197,656, filed November 27, 1950, and allowed May 4, 1951. On the other hand as shown, the front rail 16 is supported by a plurality of legs 30, the upper ends whereof are pivotally connected to the rail 16 and the lower ends whereof are detachably engageable with fittings 32 which are attached to the floor 34 of the associated plane. As will be understood, these fittings 32 may also serve as cargo anchor points.

Considering the above generally indicated elements in greater detail, the seat 14 may in the broader aspects of the invention be formed of any of a wide variety of material. Preferably, seat 14 is formed of a durable flexible material such as canvas. To enable the use of such material, spreaders 36 are connected between the side rails 16 and 18 at a plurality of points spaced lengthwise of the structure. As shown, the rear edge of the seat 14 is folded around the side rail 18, being provided with cutouts 38 to accommodate the spreaders, and the marginal edge 40 of the surface 14 being secured to such surface at a point spaced outwardly from the rail 18 by a substantial amount, for a purpose mentioned below. The connection between the marginal edge 40 and the body of the seat surface 14 may be and preferably is completed by stitching as indicated at 42.

Also as shown, the surface 14 is connected to the rail 16 looping the material therearound and stitching as indicated at 44. As is also indicated, the connection to the rail 16 is interrupted at a plurality of points 50 to accommodate the legs 10 and the corresponding ends of the spreaders 36.

As in the case of the seat surface 14, the backs 20 and 22 may be formed of various materials, a flexible but sturdy material such as canvas being preferred. In the broader aspects, the backs may be either continuous or meshlike, meshlike constructions being preferred and two such meshed formations being illustrated by the respective backs 20 and 22.

An important feature of the invention resides in making the previously mentioned connection 24 between the lower ends of the backs 20 and 22 and the seat surface 14 at a point which falls between the rails 16 and 18. This feature provides seat surface, of a depth, measured from the rail 16 which is suitable for seat purposes. Such a depth, as will be understood, is undesirably narrow for bed purposes. With the present construction, however, in which the upper ends of the backs 20 and 22 are detachably connected to the rail 26, these backs may be dropped down behind the seat surface 14, thereby affording a bed surface having a width equal to the full spacing between the rails 16 and 18. Preferably and as shown in Figure 4, the lower edge of each back is provided with an attaching tab 52, of double thickness, and stitched through as indicated at 54. The attaching tab 52 in turn is stitched as indicated at 56, to the seat surface 14.

The upper end of each back 20—22 may be detachably connected to the rail 26 in various ways. As shown, the backs 20 are provided with side strips 60 which are turned over the rail 26 and which may be secured as by a buckle 62 to corresponding short strips 64. This buckled connection enables adjustment of the amount of slack in each back 20 as will be understood, and also permits ready disconnection of each such back from the rail 26. Backs 22 may be similarly secured to the rail 26, and are illustrated as having three such connecting strips 66.

An important feature of the invention resides in giving the backs 20—22 sufficient height so that the head of the occupant is supported thereby. In the case of backs such as 22, the occupant's head may engage either the meshed or the continuous portions thereof. In the case of backs 20, head support is afforded by the upper cross strips 68.

An important but not always essential feature of the construction resides in proportioning the widths of the respective backs so that they register with the bays defined by the successive fuselage ribs 10. With such proportioning, such ribs are prevented from interfering with free flexing of the backs when in use.

In accordance with usual aircraft practice, the present structure is preferably provided with safety belts 70. An important feature of the construction resides in securing the rear ends of these belts to the seat structure in such a way as to achieve a snubbing effect. More particularly, as is shown in Figure 4, each safety belt portion 70 is turned around the rail 18, and its end is sewed to the seat surface 14. As indicated this connection may be effected by the previously mentioned stitching 56.

As illustrated, the upper ends of the legs 30, which may be and preferably are formed of tubular stock, are provided with fittings 80, which define short sleeve-like portions 82, within which the rail 16 is received, the indicated construction being one in which rail 16 is freely rotatable within each such sleeve 82. In the construction now being described, the respective sleeves 82 are provided with inwardly projecting bosses 84 which provide bearings to receive pins 86 by which the corresponding ends of the spreaders 36 are connected to the rail 16. The individual spreader legs 36 straddle the bosses 84. The other ends of the spreaders 36 are provided with fittings 90, which define sleeve-like portions 92, within which the rail 18 is freely rotatable.

It will be noticed that the spreaders 36 are illustrated as being of double construction, although the single construction of Figure 7 may also be utilized. A particular feature of the invention resides in giving the spreaders 36 a downwardly bowed character, so that they do not interfere with free flexing of the surface 14 when used as a bed. If, as is indicated in Fig. 1A, end spreaders 37 are utilized, such spreaders may also serve as caps for the rails 16—18. Such end speaders may be either bowed or straight.

In the present embodiment, the lower ends of the legs 30 are provided with fittings 100, detachably secured thereto by through bolts 102. The body of each fitting, which may be formed, for example, as a die casting, defines vertically extending diametrically opposite slots 104, within which latches 106 are pivotally secured by pins 108. Adjacent the upper ends, the slots 104 are joined by an enlarged chamber 110, the upper end whereof receives the leg 30. Chamber 110 also receives a compression spring 112 which acts between the latches 106 and urges the upper ends thereof apart. A limit to such separating movement is afforded, when the fitting is inactive, by stop portions 114, which are disposed to engage the lower end of the leg 30. Latches 106 are provided with finger portions 116, which may be engaged to press the upper ends thereof, thereby separating the lower and hooked ends 118 sufficiently far to pass over the headed retaining element 120 which is rigidly secured to the base of the depressed floor plate 32. When so engaged the hooked portions 118 lie behind and in latching relation to the annular shoulder 132 provided on the retaining element 120.

The embodiment of Figures 3 is illustrated as being a duplicate of that of Figures 1 and 2 with the exception that in this case the rails 18 and 26 are supported, through triangular bracing members 134, by uprights 136. As in the first instance, however, rail 16 is supported by the associated legs 30. As will be understood, Figure 3 illustrates the adaptability of the present constructions to locations other than those immediately adjacent an associated wall surface.

The embodiment of Figure 7 may and preferably does duplicate the embodiment of Figures 1 and 2 with the exception first, that in this instance the spreaders 140 are of single construction and the spreaders 140 and legs 30 are provided with individual connections afforded by sleeves 142 and 144, to the rail 16. The use of individual connections is advantageous for many reasons. For example, it enables an adjustment of the seat tension in the manner described and claimed in the aforesaid copending application. In addition, it enables a spacing between the legs which differs from that between the spreaders. Such different spacing may be needed, for example, to accommodate the seat structure to the locations of the floor fittings 32. In Fig. 7, also, the marginal edge 40 is adjacent the junction 24, which affords a somewhat more secure connection of the back to the seat.

The embodiment of Figure 8 provides an adjustment of the effective depth of each seat. More particularly, in this embodiment, the lower end 150 of each seat back is secured to a loop of material 152 which passes around the seat surface 14. By releasing the buckle 154 loop 152 may be moved to bring the back 150 nearer to or farther from either one of the rails 16 and 18.

In utilizing the aforesaid structures, it will be appreciated that they may readily be applied to and removed from the associated structure and that they may readily be converted for either bed or seat use, and that when not in use they may readily be folded to an out-of-the-way position. With particular reference to Figures 1 and 2, as an example, it will be appreciated that the seat structure may be removed as a whole simply by releasing the leg fittings 100 from the floor plates 32 and by releasing rails 18 and 26 from their associated wall fittings 28. An installing operation is, of course, just the reverse. To convert the structure for bed purposes, it is only necessary to disconnect the backs from the rail 26 and allow them to fall down behind the surface 14. Again, in folding the structure it is only necessary to release fittings 100 from the floor plates 32, whereupon the seat 14 can be swung upwardly to the position of Figure 2. Following such swinging, legs 30 may be turned to the out-of-the-way position indicated in Figure 2. Alternatively, with the construction of Fig. 7, the legs 30 may either be turned to the indicated position or may be dropped down so as to hang vertically downwardly from the rail 16.

Although only several specific embodiments of the invention have been described in detail, it will be appreciated that various modifications in the form, number, and arrangement of the parts may be made without departing from the spirit and scope of the invention.

Certain subject matter including the safety belt feature and the releasable latch for the legs of the seat structure is claimed in a co-pending application of the present inventors, Serial No. 223,976, filed May 1, 1951.

What is claimed is:

1. In a combined bed and seat structure for detachable connection to associated means having a floor and supporting parts elevated above the floor, said structure comprising laterally spaced elongated front and rear side rails, flexible material extending between and connected to the rails, said material forming an elongated bed surface and a plurality of seat surfaces, a plurality of seat backs each connected at its lower end to said flexible material at a point spaced outwardly from said rear rail, means adapting the upper ends of said backs for releasable connection to certain of said elevated parts, means adapting said rear rail for releasable connection to others of said elevated parts, a plurality of legs connected at their upper ends to said front rail and adapted for releasable connection at their lower ends to said floor, and a plurality of spreaders extending between said rails for maintaining them in spaced relation.

2. The structure of claim 1 including means pivotally supporting said seat surface and spreaders for rotation about a horizontal axis adjacent said rear rail, whereby said seat surface and spreaders can be swung upwardly about said axis and including means to support said legs for pivotal movement relative to said seat surface.

3. In a seat structure, the combination of means defining a seat surface elongated to accommodate several persons sitting in a side by side relation and facing in a direction at right angles to the length of the seat surface, said seat surface having front and rear edges, means defining a plurality of seat backs each of which is individually movable between a raised position and a lowered position in which it overlies at least part of the seat surface, means individual to each said seat back for connecting it to the seat surface at a point intermediate the said edges and so that when raised the corresponding back faces in a direction at right angles to the length of the seat surface, said connecting means each including means permitting said movements without disrupting the connection between said seat surface and the corresponding back, said intermediate connections causing the effective depth of the structure as a seat to be less than its overall width.

4. In a collapsible seat structure, flexible sheet-like means for receiving and supporting a human body and comprising an elongated seat surface adapted to seat a plurality of persons side by side and a corresponding plurality of individual backs in their normal operative positions extending upwardly from and at least in part supporting said seat surface, each back having means to detachably secure its upper end portion to a suitable upper support in operative body supporting position, whereby with its upper end portion detached, each back may be flexibly swung relative to said seating surface.

5. The seat structure of claim 4 in which each said back is permanently secured to said seat surface intermediate the front and back edges of the seat surface.

6. In a collapsible lightweight seat structure adapted to be secured to and along the inner upright side wall of a vehicle, elongated flexible textile fabric sheetlike means providing a seating surface and a plurality of individual backs for a plurality of persons side by side and having securing means along its rear length adapted to be connected to a part of said side wall, front support means for said sheetlike means, and said individual backs being movable relative to each other, means on each of said backs adapted to adjustably secure its upper end portion to an upper part of said upright vehicle side wall and each in its operative position at least in part supporting and being tensioned by said seating surface.

7. The seat structure of claim 6 in which said sheet-like means comprises different pieces for said seating surface and said backs which are sewed together along a line intermediate the said front support means and the said rear securing means.

8. The seat structure of claim 15 in which said seat structure includes means between the front and rear edges of said seat member to adjust the position from which said back extends upwards and in which the back's upper securing means is adjustable to permit changes in effective length of the back to permit said front to rear adjustment and to give the desired tension in the back.

9. A fold up and removable, lightweight airplane seat structure having a substantially horizontal, elongated, front support and associated front legs swingable about its axis and having at their lower ends securing means adapted to be detachably connected to the airplane floor, substantially horizontal seat structure including a sheetlike seating surface forming member having front and rear loops, said front loop pivotally embracing said front support and said rear loop being adapted to removably and pivotally embrace a support such as a substantially horizontal elongated rear support member secured at spaced intervals on the airplane side wall, and a back having at its upper end means adapted to detachably secure it to said side wall and its lower end connected to said seat surface for swinging motion relative thereto, whereby an imaginary line between the connections adapted to engage the airplane structure at its floor and side wall with the seat in its operation position may be considered as forming, in effect, one side of a triangle the other two sides of which are provided by the seat's front legs and its seating surface, to thus utilize airplane structure and reduce seat weight, and whereby the seat surface and its front legs may be relatively folded and both swung up relative to the back and about the rear support on the side wall, and whereby the seat may be removed by disconnecting the said lower detachable leg securing means, said rear loop of said seating surface, and said upper seat back connection.

10. The organization of claim 9 in which said sheetlike member and said back are of flexible textile fabric and said horizontal seat structure includes spreader members normally extending between said front and rear supports and having means adapted to detachably and swingably engage said rear support.

11. A fold-up and also removable lightweight airplane troop seat structure having an elongated substantially horizontal front support and front leg means therefor swingably mounted thereon including securing means adapted to detachably secure said leg means to the airplane floor, said seat structure including a seating surface forming member operatively connected to said front support having means at its rear adapted to be removably and pivotally engaged to and along the upright side wall of an airplane, said seat structure also including a flexibly collapsible back swingably connected to said seating surface member and having at its upper end securing means adapted to detachably secure said back to said airplane side wall and arranged to be collapsed upon upward swinging of said seating surface member, whereby said seat may have its front leg means swingably folded against said seating surface member and both said seating surface member and said front leg means may be swingably folded adjacent said airplane side wall and whereby said seat can be removed by disconnecting its three connections adapted to connect to the airplane at the seat's front leg means, the rear of its seating surface, and the upper end of its back.

12. A lightweight adjustable seat structure comprising substantially horizontal and spaced-apart, rigid, elongated, front, rear, and upper rear back supports, a human body engaging flexible sheet forming a seating surface and an upwardly extending back portion extending upwardly from and at least in part supporting in tension said seating surface, said seating surface also being supported in tension between said front and rear supports, said back being connected operatively to said seating surface at a location intermediate its front and rear supports and to said upper back support, and a plurality of interacting adjustment means including seat-surface tension-adjustment means, said seat structure being adjustable to vary the depth from the front of the seat to the said location of said lower end of the said back by motion between said front and rear supports of said back-to-seat surface connection, and co-operating adjustable means to vary the effective length of the flexible back between its upper and lower connections and thus adjust its tension and permit said depth adjustment.

13. A light airplane seat structure having a seat surface supported at its rear by horizontally spaced connections to the spaced-apart upright frame members of the airplane side wall, an entirely flexible sheetlike back connected to said surface and adjustably and detachably connected adjacent its upper end to the airplane side wall to be adjustably tensioned therebetween and whereby when its upper end is detached it may be flexibly swung to hang down in the space behind the seat and between said upright frame members.

14. For use in an airplane, a seat structure comprising directly connected canvaslike seat and back portions, said back portion including an upper support which in its operative position is connected to suitable means on the upright side wall of the airplane, swingably movable front support means including legs for said seat portion with detachably connectible means to engage and be carried by the airplane floor, said seat portion including a rear support spaced rearwardly from the lower end of said back portion and in its operative position connected to suitable means on said upright side wall of the airplane, and flexible tension connecting means acting between said seat rear support and the rear of said seat portion and the lower connected end of said back portion, whereby said seat portion may be swung up against said airplane side wall with a flexible collapse of said back portion to permit said swinging without disconnecting the said back from its upper support.

15. A fold up, lightweight airplane seat structure comprising, a seat surface member extending horizontally in its operative position having leg means foldably connected thereto adjacent its front edge and having pivotal securing means located adjacent its rear edge for connection to said airplane wall structure to permit upward swinging of said surface from said operative position to lie adjacent said airplane side wall, a back extending upwardly from and supporting said seat surface member at a location intermediate its front and rear edges, and having securing means adjacent its upper end to connect to said airplane wall structure, said back being entirely flexible to permit collapse thereof upon upward swinging of said seating surface to fold up said seat structure.

16. In a seat structure, the combination of means defining a seat surface elongated to accommodate several persons sitting in a side by side relation and facing in a direction at right angles to the length of the seat surface, said seat surface having front and rear edges, means defining at least one seat back, movable between a raised position and a lowered position in which it overlies at least part of the seat surface, means connecting said back to the seat surface at a point intermediate the said edges and so that when raised the back faces in a direction at right angles to the length of the seat surface, said connecting means including means permitting said movement without disrupting the connection between said seat and back, said intermediate connection causing the effective depth of the structure as a seat to be less than its over-all width and wherein said connecting means further includes means providing an adjustable connection between the lower end of the seat back and the seat surface, whereby the effective depth of the structure as a seat can be varied, and wherein the seat back is provided with means adapted to provide a releasable support for its upper end, said last-mentioned means being normally released to move said back to its lowered position.

17. The seat structure of claim 6 in which said seating surface is provided with a swingable connection with said rear securing means to permit swinging of said seating surface with its front support means about said rear securing means, whereby said seat structure is adapted to fold up against said vehicle side wall.

ROBERT B. EVANS.
SULO M. NAMPA.

REFERENCES CITED

The following references are of record in the file of this patent:

UNITED STATES PATENTS

| Number | Name | Date |
|---|---|---|
| 533,727 | McCoffrey | Feb. 5, 1895 |
| 622,993 | Chamberlain | Apr. 11, 1899 |
| 647,920 | Enright et al. | Apr. 17, 1900 |
| 1,007,817 | Tandy | Nov. 7, 1911 |
| 1,252,252 | Doraite | Jan. 1, 1918 |
| 1,305,388 | Luria | June 3, 1919 |
| 1,305,440 | Brewer | June 3, 1919 |
| 1,359,637 | Travis et al. | Nov. 23, 1920 |
| 1,744,243 | Pludorski | Jan. 21, 1930 |
| 1,858,254 | Uline | May 17, 1932 |
| 2,087,984 | McAfee et al. | July 27, 1937 |
| 2,127,795 | Whedon | Aug. 23, 1938 |
| 2,250,193 | Emery et al. | July 22, 1941 |
| 2,309,445 | Edwards | Jan. 26, 1943 |

FOREIGN PATENTS

| Number | Country | Date |
|---|---|---|
| 4,872 | Great Britain | Feb. 26, 1913 |
| 13,996 | Great Britain | A. D. 1889 |
| 16,289 | Great Britain | A. D. 1898 |
| 25,156 | Denmark | Oct. 27, 1919 |